United States Patent [19]

Albrecht

[11] Patent Number: 5,768,250

[45] Date of Patent: *Jun. 16, 1998

[54] ERROR RECOVERY IN A NETWORK HAVING CASCADED HUBS

[75] Inventor: Alan R. Albrecht, Granite Bay, Calif.

[73] Assignee: Hewlett-Packard Company, Palo Alto, Calif.

[ * ] Notice: The term of this patent shall not extend beyond the expiration date of Pat. No. 5,701,305.

[21] Appl. No.: 858,995

[22] Filed: May 20, 1997

Related U.S. Application Data

[60] Continuation-in-part of Ser. No. 237,746, May 4, 1994, Pat. No. 5,469,439, which is a division of Ser. No. 397,827, Mar. 3, 1995, Pat. No. 5,701,305.

[51] Int. Cl.[6] .......................... H04L 12/417; H04L 12/44; G01R 13/28
[52] U.S. Cl. .......................... 370/216; 370/242; 370/408; 370/450; 340/825.02; 340/825.08; 340/825.16; 340/825.5; 371/48; 395/181
[58] Field of Search .......................... 370/216, 221, 370/242, 408, 449, 450; 340/825.02, 825.54, 825.5, 825.08, 825.1, 825.16; 371/32, 48; 395/181, 182.02

[56] References Cited

U.S. PATENT DOCUMENTS

| | | | |
|---|---|---|---|
| 4,347,498 | 8/1982 | Lee et al. | 340/825.02 |
| 4,716,408 | 12/1987 | O'Connor et al. | 340/825.5 |
| 4,847,610 | 7/1989 | Ozawa et al. | 340/825.16 |
| 4,885,742 | 12/1989 | Yano | 370/408 |
| 5,018,139 | 5/1991 | Despres | 370/408 |
| 5,245,616 | 9/1993 | Olson | 371/32 |
| 5,450,578 | 9/1995 | Mackenthum | 395/182.02 |

*Primary Examiner*—Hassan Kizou

[57] ABSTRACT

A network system includes end nodes which are connected to a plurality of cascaded hubs. Each hub is able to generate a network error packet when a timeout is detected. More specifically, a first hub starts a first timer upon the first hub acknowledging a grant to a first device connected to a first port of the first hub. Upon expiration of the first timer without the first hub beginning to receive a first network packet over the first port, the first hub begins to send a first error packet to a second device connected to the first hub. If the first hub begins to receive a second error packet over the first port after expiration of the first timer and before the first hub has completed sending the first error packet, the first hub appends the second error packet to the first error packet. If the first hub does not begin to receive any error packet over the first port before completely sending the first error packet, the first hub marks the first port as failed.

10 Claims, 12 Drawing Sheets

ERROR RECOVERY IN A NETWORK HAVING CASCADED HUBS

CROSS REFERENCE TO RELATED APPLICATION

This application is a continuation-in-part of application Ser. No. 08/237,746, filed May 4, 1994, now U.S. Pat. No. 5,469,439. It is also a divisional of application Ser. No. 08/397,827, filed Mar. 3, 1995, now U.S. Pat. No. 5,701,305.

BACKGROUND

The present invention concerns error recovery in a network having cascaded hubs.

Various topologies may be used to connect network stations together in a local area network. In one topology, a hub may be directly connected to several network stations, called end nodes. Each end node connected to the hub communicates to other end nodes connected to the hub by sending network packets to the hub which the hub forwards to one or more of the other end nodes.

When, at one time, more than one end node desires to forward network packets to the hub, some form of arbitration scheme is necessary to assure that no transmissions are lost or garbled since only one packet can be transmitted over the network at any one time. When there is only a single hub in the local area network, the hub can, with limited overhead, enforce a fair and effective arbitration scheme.

It is desirable, however, to allow for expansion of a hub network by adding additional hubs. This is done, for example, by cascading the hubs. See U.S. Pat. No. 4,716,408 issued to Stuart O'Connor, et al. for *Data Transmission System of the Star Type with Enablement Passing*.

It is desirable to provide arbitration schemes which simultaneously provide priorities, cascaded hubs and both fair and effective arbitration. What is meant by a fair arbitration scheme is one which treats requests by all end nodes in an even-handed manner. That is, no end nodes are put at a disadvantage because they are connected to one hub and not to another hub. What is meant by an effective arbitration scheme is one in which network throughput is maximized. That is, when end nodes are contending for network resources, the amount of time the network is idle or in arbitration is minimized.

In addition to issues of arbitration, it is important to provide in a cascaded network an ability to recover from errors such as dropped signals, lost packets, and disconnected hubs. A lack of such an ability to recover from errors, could result in significant impedance to smooth performance of the network.

SUMMARY OF THE INVENTION

In accordance with the preferred embodiment of the present invention, a network system includes end nodes which are connected to a plurality of cascaded hubs. Each hub is able to generate a network error packet when a timeout is detected. More specifically, a first hub starts a first timer upon the first hub acknowledging a grant to a first device connected to a first port of the first hub. Upon expiration of the first timer without the first hub beginning to receive a first network packet over the first port, the first hub begins to send a first error packet to a second device connected to the first hub. If the first hub begins to receive a second error packet over the first port after expiration of the first timer and before the first hub has completed sending the first error packet, the first hub appends the second error packet to the first error packet. If the first hub does not begin to receive any error packet over the first port before completely sending the first error packet, the first hub marks the first port as failed.

In the preferred embodiment, the error packet contains void data. For example, the data within the error packet may be all zeros. When the first hub appends the second error packet to the first error packet, this may be done, for example, by adding the actual content of the second error packet to the first error packet, or merely by elongating the first error packet (for example by adding void data) an amount equal to the length of the second error packet.

In the preferred embodiment of the present invention, the second error packet is appended to the first error packet so that the first error packet includes a portion of the first error packet sent by the first hub before the first hub began to receive the second error packet and includes the entire second error packet.

The present works effectively in a network in which hubs are stacked. For example, when the first device is a second hub, the second hub starts a second timer upon the second hub acknowledging the grant to a third device connected to a first port of the second hub. If the second timer expires without the second hub beginning to receive the first network packet from the third device, the second hub begins to send the second error packet to the first hub. If the second hub begins to receive a third error packet from the third device before completely sending the second error packet, the second hub appends the third error packet to the second error packet. If the second hub does not begin to receive any error packet from the third device before completely sending the second error packet, the second hub marks the first port of the second hub as failed.

In the preferred embodiment of the present invention, the third error packet is appended to the second error packet so that the second error packet includes a portion of the second error packet sent by the second hub before the second hub began to receive the third error packet and includes the third error packet. For example, the third device may be an end node or another hub.

The present invention allows for network recovery for an error which results in a network packet being dropped. The invention additionally allows for isolation of the impact of the error to be limited to the end node or hub which actually caused the error.

DESCRIPTION OF THE PREFERRED EMBODIMENT

Figure 1:
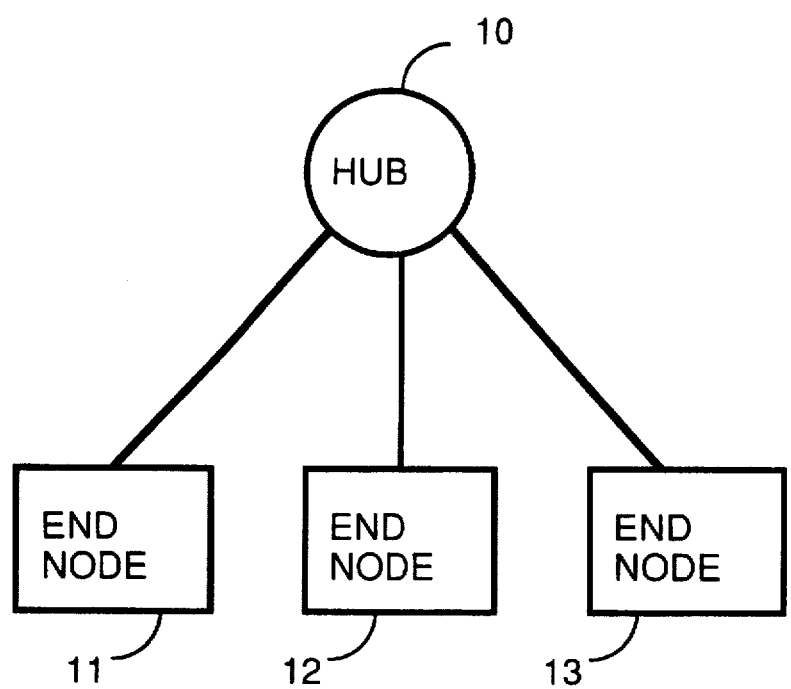
FIG. 1 shows end nodes connected to a single hub in a network configuration.

FIG. 1 shows a hub 10 connected to an end node 11, an end node 12 and an end node 13. In the embodiment shown in FIG. 1, each of end nodes 11, 12, and 13 is connected to hub 10 using four twisted wire pairs. For more information on connection of a hub to end nodes, see copending patent Ser. No. 07/972,694 filed on Nov. 6, 1992 by Alan Albrecht, Steven Harold Goody, Michael Peter Spratt, Joseph Anthony Curcio, Jr. and Daniel Joseph Dove for HIGH SPEED DATA TRANSFER OVER TWISTED PAIR CABLING, which is hereby incorporated by reference.

The protocol for sending messages is summarized as follows. Each four twisted wire pair link between hub 10 and each end node has three stable states.

In the first stable state, hub 10 is sending a packet to the end node on all four twisted wire pairs. In the preferred embodiment, in this transmission there is a total bandwidth of 100 megabits per second (Mb/s). In the second stable state, the end node is sending a packet on all four twisted pairs. In the preferred embodiment, in this transmission there is also a total bandwidth of 100 Mb/s. In the third stable state, the end node is sending low frequency tones on two twisted wire pairs (twisted wire pair one and twisted wire pair two) and the hub is sending low frequency tones on the other two twisted wire pairs (twisted wire pair three and twisted wire pair four).

There are two possible tone frequencies on each twisted wire pair. Thus, the end node can transmit four possible tone combinations on twisted wire pair one and twisted wire pair two. For example a first possible tone combination is to send a one megahertz (MHz) tone on twisted wire pair one and a one MHz tone on twisted wire pair two. A second possible tone combination is to send a one MHz tone on twisted wire pair one and a two MHz tone on twisted wire pair two. A third possible tone combination is to send a two MHz tone on twisted wire pair one and a one MHz tone on twisted wire pair two. A fourth possible tone combination is to send a two MHz tone on twisted wire pair one and a two MHz tone on twisted wire pair two.

Similarly, the hub can transmit four possible tone combinations on twisted wire pair three and twisted wire pair four. A first possible tone combination is to send a one megahertz (MHz) tone on twisted wire pair three and a one MHz tone on twisted wire pair four. A second possible tone combination is to send a one MHz tone on twisted wire pair three and a two MHz tone on twisted wire pair four. A third possible tone combination is to send a two MHz tone on twisted wire pair three and a one MHz tone on twisted wire pair four. A fourth possible tone combination is to send a two MHz tone on twisted wire pair three and a two MHz tone on twisted wire pair four.

The tone combinations are selected of a low enough frequency to avoid contributing in any significant way to crosstalk. These tone combinations are used to convey certain well defined information. For example, in the preferred embodiment, tone combinations from end nodes 11, 12 or 13 to hub 10 indicate one of the following: "Idle", "ReqH" (high priority request) or "ReqN" (normal priority request). The fourth tone combination is reserved for future use. The tone combinations from hub 10 to end nodes 11, 12 or 13 indicate one of the following: "Idle", "Incoming" or "Preempt" message. The remaining tone combination is reserved for future use. In the preferred embodiment the message signal is used as described below.

Additionally, a special tone combination from hub 10 to end nodes 10, 11, 12 is "Ready to Receive". This special tone combination is signaled by silence (no tones) on twisted wire pair three and twisted wire pair four. The Ready to Receive functions as an acknowledge (Ack) by hub 10 to a request received from one of end nodes 10, 11 or 12.

Figure 2:
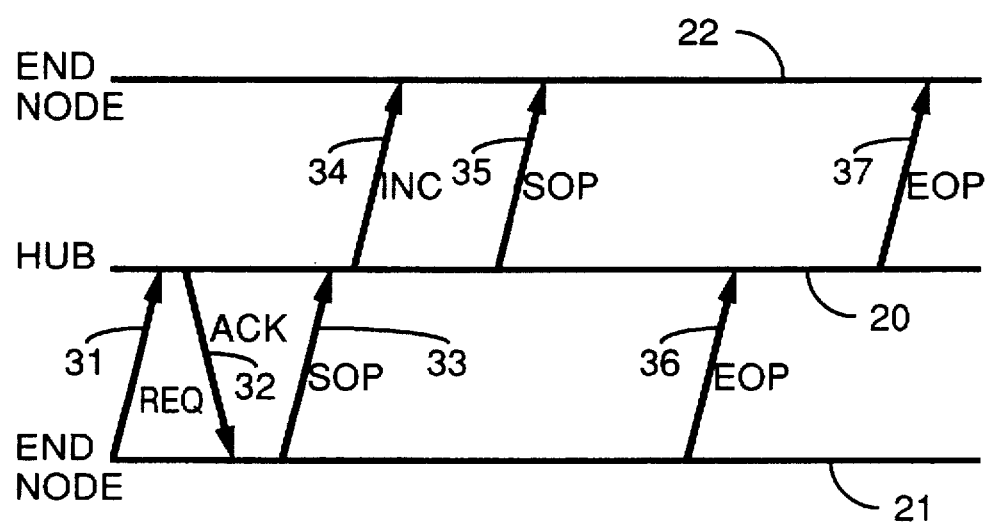
FIG. 2 illustrates the basic operation of a protocol for the network configuration shown in FIG. 1.

FIG. 2 illustrates the operation of the protocol for use in the transfer of a network packet. A first end node, represented by a line 21, sends to hub 10, represented by a line 20, a request, as represented by an arrow 31. The request is either a ReqH or ReqN depending on the priority of the network packet. After receiving the request, hub 10 sends an acknowledge in response, as represented by an arrow 32. As discussed above, this is silence on twisted wire pair three and twisted wire pair four. Thus, the end node actively transmits the request (ReqH or ReqN) on twisted wire pair one and twisted wire pair two. Upon detecting the acknowledge on twisted wire pair three and twisted wire pair four, the first end node starts sending the network packet to hub 10, as represented by a start of packet (SOP) arrow 33.

Hub 10 starts receiving the network packet and temporarily stores the first part of the network packet until the destination address is completely received by hub 10. At this time, the destination port to which the packet is to be sent can be quickly ascertained. Upon receiving the start of the network packet, hub 10 sends the Incoming message tone combination to all other end nodes, as represented by an arrow 34. This causes the other end nodes to stop sending request (ReqH or ReqN) or Idle on their twisted wire pair one and twisted wire pair two. Thus, when hub 10 starts sending the network packet on all four twisted wire pairs to a destination end node, as represented by arrow 35, the destination end node is not actively transmitting on any twisted wire pair. The destination end node is represented by a line 22. An arrow 36 represents the end of packet (EOP) sent from the first end node to hub 10. An arrow 37 represents the end of packet (EOP) sent from hub 10 to the destination end node.

Figure 3:
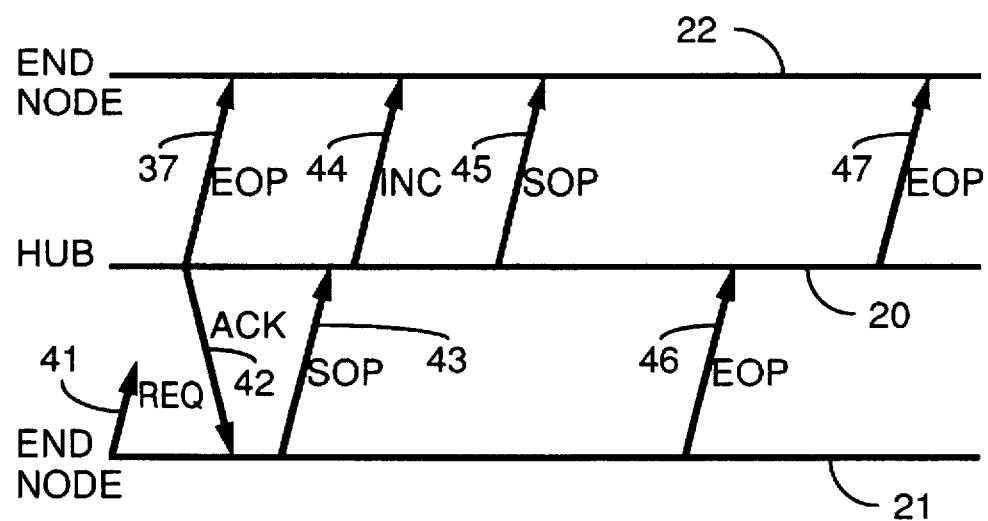
FIG. 3 illustrates the further operation of a protocol for the network configuration shown in FIG. 1.

By allowing an end node to originate back-to-back network packets, network throughput may be increased. This is illustrated by FIG. 3. In FIG. 3, after the first end node has completed sending the first network packet, as described in the discussion of FIG. 2 above, the first end node sends to hub 10 another request, as represented by an arrow 41. The request is either a ReqH or ReqN depending on the priority of the second network packet. Immediately upon sending the end of the network packet to the destination end node, as represented by arrow 37, hub 10 sends another acknowledgment to the first node, as represented by an arrow 42. (In the preferred embodiment, when hubs are cascaded, the second message is not immediately sent, but rather the end node must wait for its next turn to send the second message). As discussed hub 10 acknowledges the first node by silence on twisted wire pair three and twisted wire pair four. Upon detecting the acknowledge on twisted wire pair three and twisted wire pair four, the first end node starts sending the second network packet to hub 10, as represented by a start of packet (SOP) arrow 43.

Hub 10 starts receiving the second network packet and temporarily stores the first part of the second network packet until the destination address is completely received by hub 10. At this time, the destination port to which the second network packet is to be sent can be quickly ascertained. In the example illustrated by FIG. 3, the second network packet is sent to the same destination; however, the destination may be any end node, other than the first end node, connected to hub 10.

Upon receiving the start of the second network packet, hub 10 sends the Incoming message tone combination to all other end nodes, as represented by an arrow 44. This causes the other end nodes to stop sending request (ReqH or ReqN) or Idle on their twisted wire pair one and twisted wire pair two. Thus, when hub 10 starts sending the second network packet on all four twisted wire pairs to a destination end node, as represented by arrow 45, the destination end node is not actively transmitting on any twisted wire pair. An arrow 46 represents the end of the second network packet sent from the first end node to hub 10. An arrow 47 represents the end of the second network packet sent from hub 10 to the destination end node.

Figure 4:
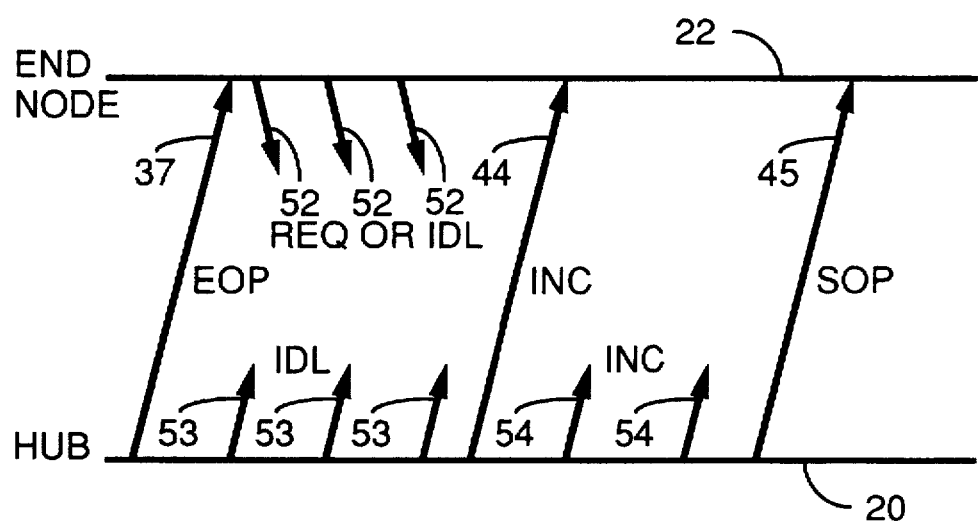
FIG. 4 illustrates in more detail operation of the protocol shown in FIG. 3.

FIG. 4 shows additional detail of network operation in the interpacket gap between the end of the first network packet and the start of the second network packet. The interpacket gap has two parallel functions. First, in order to determine which end node the second network packet should be sent to, hub 10 uses the interpacket gap to temporarily store the start of the second network packet, and look up the destination address for the second network packet.

Second, the interpacket gap allows the destination end node to send a request to hub 10, before the request is cut off by the Incoming signal from hub 10. This is represented by arrows 52. If the destination end node does not desire to send a network packet, the destination node forwards an Idle signal to hub 10. End nodes which do not receive the first network packet also can send a request to hub 10 during the interpacket gap. However, in addition, the end nodes which do not receive the first network packet can also send a request to hub 10 at the same time the first network packet is being sent to the destination end node.

The request window extends from the time hub 10 transmits the end of the first packet, represented by arrow 37, until time hub 10 begins sending the incoming signal, represented by arrow 44. During the request window, hub 10 continuously sends the idle signal, as represented by arrows 53 to the end nodes. At the completion of the request window, hub 54 sends the incoming signal represented by arrow 44 and arrows 54, to all the end nodes except the end node which will transmit the network packet. Each end node, upon receiving the incoming signal from hub 10 stops sending the idle signal or the request signal in order to be ready to receive a network packet from hub 10.

The request window needs only to be long enough to allow the destination end Node to send out a request of sufficient duration for hub 10 to recognize the request. The request window duration is therefore largely determined by the time for the hub to acquire the request, and is independent of the propagation time required to send a message from hub 10 to an end node. For example, in the preferred embodiment, the request window has a duration of approximately 850 nS. The period during which hub 10 sends the incoming signal to the end nodes, called the line turnaround period, is determined largely by the maximum round-trip propagation delay between hub 10 and the end node, plus the time to receive enough of the incoming packet to determine the destination address. The round-trip propagation delay from hub 10 to an end node, in the preferred embodiment, is approximately 1.8 microsecond for a cable distance of 180 meters.

The request window and the line turnaround period are only important for embodiments of the present invention which utilize half-duplex links. In the case of fiber optic links, for example, between cascaded hubs, the connection will be dual simplex, and so there is no requirement to allow additional time for a second level hub to pass a request to a root hub. This is because while the root hub is sending a packet to the second level hub, the second level hub can pass requests back to the root hub.

In an alternate embodiment, hub 10 sends the "Incoming" signal at the same time the "Acknowledgment" signal is sent. In this case, any end node with a packet sends a "Request" immediately at the end of a last packet, even though it is receiving an "Incoming" signal. The end node continues sending the "Request" signal only for a short time, and then removes the "Request" in preparation to receiving a packet.

Figure 5:
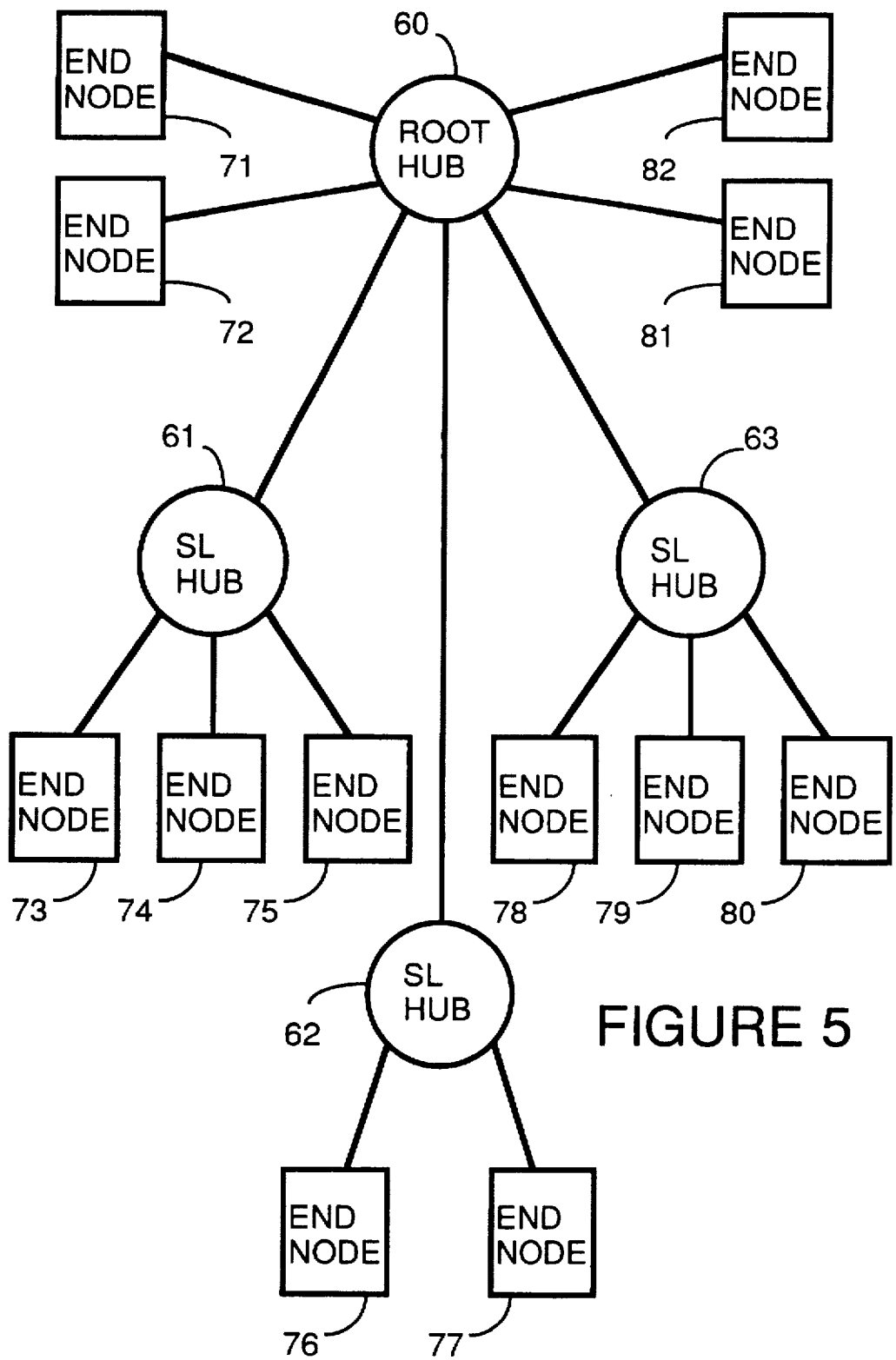
FIG. 5 shows end nodes connected to a plurality of cascaded hubs in accordance with a preferred embodiment of the present invention.

FIG. 5 shows an example of a network system with cascaded hubs according to the preferred embodiment on the present invention. In FIG. 5, a root hub 60 is connected to an end node 71, an end node 72, an end node 81 and an end node 82. Root hub 60 is also connected to a second level hub 61, a second level hub 62 and a second level hub 63. Second level hub 61 is connected to an end node 73, an end node 74 and an end node 75. Second level hub 62 is connected to an end node 76 and an end node 77. Second level hub 63 is connected to an end node 78, an end node 79 and an end node 80.

In the preferred embodiment, the interconnections are with non-bundled four-pair Category 3, or better, unshielded twisted pair cable, two-pair shielded twisted pair cable or optical fiber. A second level hub will communicate on half-duplex links with root hub 60, using the protocol illustrated by FIG. 3 and FIG. 4. Alternately, dual simplex fiber optic links may be used when longer distances separate root hub 60 from the second level hubs. In the preferred embodiment, the interhub connections are not through bundled cable.

The protocol used to transfer network packets from end nodes 71, 72, 81 and 82 is the same as in the single hub case described above. The protocol used to transfer network packets from end nodes 73, 74 and 75 to second level hub 61, to transfer network packets from end nodes 76 and 77 to second level hub 62, and to transfer network packets from end nodes 78, 79 and 80 to second level hub 63 is also the same as in the single hub case described above. The protocol used to transfer network packets from second level hubs 61, 62 and 63 to root hub 60 is also the same as in the single hub case described above, with slight modifications, as described below.

Addressing for the network shown in FIG. 5 is summarized as follows. All network packets are seen by all hubs. Each hub, however, employs an address filter so that unicast network packets are only sent on to an end node if the destination address of the network packet matches the address of the end node. If a bridge or network monitor is attached to the network, all packets are also forwarded to the bridge or network monitor.

In the preferred embodiment of the present invention, the cascaded hubs maintain an enhanced two priority round robin arbitration. In the two priority round robin arbitration, end nodes send a request at either high priority or normal priority. Once requests have been received, proceeding to each in turn, each end node with a high priority network packet is allowed to send the network packet. This continues until all high priority network packets have been sent. Then, while there are no requests to send high priority network packets, proceeding it each in turn, each end node with a normal priority network packet is allowed to send one network packet. In the preferred embodiment, only one network packet is sent, however, it is contemplated that in alternate embodiments of the present invention, more than one network packet may be sent.

During operation, all network packets are sent to root hub 60 which relays them onto the attached second level hubs. Request and other tone combinations can be sent between end nodes and the root hub, between end nodes and the second level hub, and between the second level hub and root hub 60 during interpacket gaps. The interpacket gaps are forced by the protocol to be at least a minimum time duration sufficient to allow requests and tone combinations to be sent and received.

For example, during a request window of an interpacket gap, the end nodes attached to each second level hub will send to the second level hub request tone combinations. Each second level hub which receives a request, forwards the request to root hub 60. The request forwarded by a second level hub to root hub 60 reflects the highest priority level of the requests the second level hub received from its end nodes. If a second level hub receives one or more high priority requests from one or more end nodes, the second level hub sends a high priority request to root hub 60. If the second level hub receives no high level requests from its end nodes, but receives one or more normal priority requests from one or more of its end nodes, the second level host will forward to root hub 60 a normal priority request. If the second level hub is not receiving any requests from attached end nodes, then the second level hub sends an idle during the request window of the interpacket gap.

When root hubs 60 sends an acknowledge (i.e., silence) to a second level hub, the second level hub becomes the acknowledged second level hub. If the acknowledged second level hub has been sending high priority requests to root hub 60, then the second level hub sends an acknowledge to one of its end nodes which has made a high priority request. The end node receiving the acknowledge will send a network packet which the second level hub will send to root hub and to any end node connected to the second level hub to whom the network packet is addressed. When the acknowledged end node has completed sending the network packet, the second level hub will continue a sweep of its end nodes until all its end nodes that have made a high priority request have had a single opportunity to send a high priority network packet.

The second level hub sends a two tone signal sequence to an upper level hub upon completion of sending a network packet. The two-toned sequence lets an upper level hub know the state of the round robin in the lower level hub. This allows for an increase in fairness and efficiency. For example, the two-toned sequence communicates to the upper level hub whether the lower level hub has finished a sweep of end nodes with normal priority network packets when transmission of packets of normal priority by the lower level hub is preempted so that a high level packet may be transmitted. The information in the two tone signal sequence will communicate to the upper level hub whether, when all the high priority network packets have been sent, it is necessary to return to the lower level hub which was preempted, or to continue processing normal priority network packets with another lower level hub.

In the preferred embodiment, the two tone signal sequences includes two tones. The first tone is sent for seventy-two clock cycles. The second tone is sent until the lower level hub receives incoming or grant from the higher level hub. In the case of an error, the sequence is repeated. Also, in the preferred embodiment, the clock used to time the seventy-two clock cycles operates at 30 megahertz.

When the lower level hub is processing high priority network packets, as long as there are still high level packets left to be sent, the lower level hub passes up to the higher level hub, after each high priority network packet a two-toned sequence which is a ReqH followed by a ReqH. When the lower level hub is processing normal priority network packets, as long as there are still normal level packets left to be sent and the lower level hub is not preempted, the lower level hub passes up to the higher level hub, after each normal priority network packet a two-toned sequence which is a ReqN followed by a ReqN.

When the lower level hub has completed a sweep of the end nodes with normal priority network packets to send, and all pending requests in the lower level hub have been satisfied, the two-toned sequence passed from the lower level hub to the higher level hub is an Idle followed by an Idle.

When the lower level hub has completed a sweep of the end nodes with high priority network packets to send, and there still remain high priority network packets to be sent by the lower level hub, the two-toned sequence passed from lower level hub to the higher level hub is an Idle followed by a ReqH. This indicates to the higher level hub that the lower level hub has completed the sweep, but there are still additional high priority network packets to send. After all other hubs have conducted a sweep of high priority network packets, the higher level hub will return the grant to the lower level hub.

When the lower level hub has completed a sweep of the end nodes with high priority network packets to send and there still remain normal priority network packets to be sent by the lower level hub, the two-toned sequence passed from lower level hub to the higher level hub is an Idle followed by a ReqN. This indicates to the higher level hub that the lower level hub has completed the sweep, but there are still additional normal priority network packets to send. After other hubs have had a chance to perform a sweep of pending normal priority requests, the higher level hub will return the grant to the lower level hub.

When a sweep of normal priority network packets is preempted so that a high priority network packet could be transmitted, if the lower level hub conducting the sweep did not complete the sweep, the two-toned sequence passed from lower level hub to the higher level hub is an Idle followed by a return signal. The return signal is signaled by silence (no tones) on twisted wire pair one and twisted wire pair two. This indicates to the higher level hub that the normal priority network packet sweep by the lower level hub was interrupted before it was completed. Therefore when all pending high priority network packets have been attended to, the higher level hub will acknowledge the lower level hub in order to allow the lower level hub to complete a sweep of normal priority network packets.

For example, during a sweep, while there are still end nodes attached to the second level hub which have not yet had their opportunity to send their high priority network packets, after a network packet is forwarded by the second level hub to root hub 60, the second level hub forwards to the root hub a two-tone high level request sequence, as discussed above. The second level hub also sends an acknowledge to the next end node to send a high priority network packet, without waiting for an acknowledge from root hub 60.

Once the second level hub has completed a single sweep of its end nodes, the second level hub will return a two-tone idle sequence to root hub 60, as discussed above. On receiving the two-tone idle sequence, root hub 60 recognizes that the second level hub has finished its part of the high priority round robin sequence. Root hub 60 then continues by sending an acknowledge to the next (in turn) second level hub or end node directly coupled to the root hub that has made a high priority request. This will proceed until all high priority network packets have been sent. Then, while there are no requests to send a high priority network packet, proceeding in turn, each end node with a normal priority network packet is allowed to send the network packet.

Operation of requests and acknowledges in the network shown in FIG. 5 is further illustrated by way of example. In the example, end node 71, end node 73, end node 75, end node 77 and end node 81 each request to send a network packet with high priority. Likewise, end node 72, end node 74, end node 76, end node 78, end node 79, end node 80 and end node 81 each request to send a network packet with normal priority.

Thus, for the example set out above, presuming root hub 60 is at the start of its cycle, the order in which the high priority requests will be serviced is end node 71, end node 73, end node 75, end node 77 and end node 81. Assuming that there are no more high priority network packets queued at the end nodes, and therefore no more high priority requests, the normal priority requests will be serviced in the following order: end node 72, end node 74, end node 76, end node 78, end node 79, end node 80 and end node 81.

In this example, root hub 60 will first grant an acknowledge to end node 71. After end node 71 has sent its high priority network packet, end node 71 will send an idle signal to root hub 60. Root hub 60 will then send an acknowledge to second level hub 61. Second level hub 61 will then send an acknowledge to end node 73.

Figure 6:
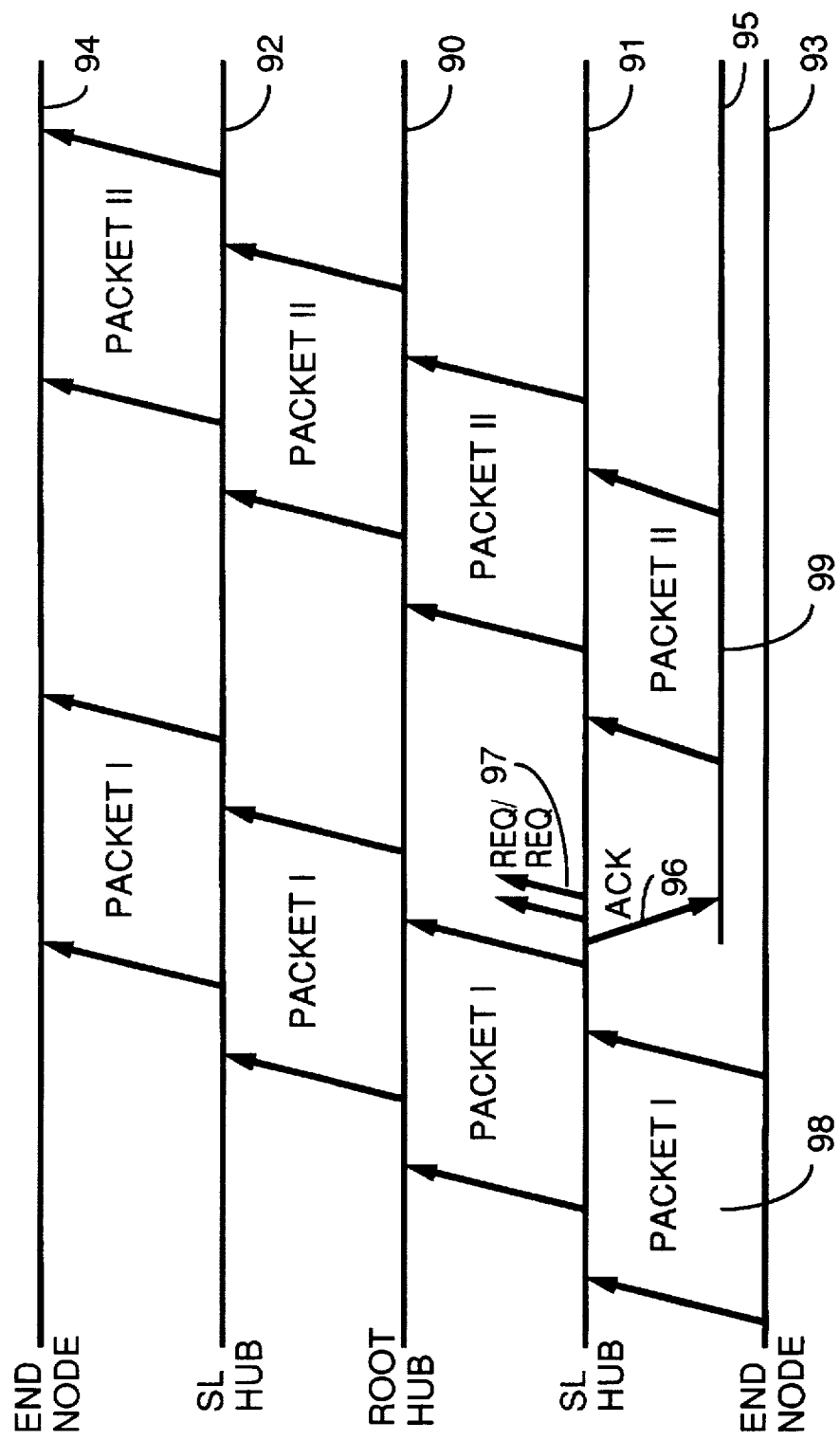
FIG. 6 illustrates the operation of a protocol for the network configuration shown in FIG. 5 in accordance with a preferred embodiment of the present invention.

FIG. 6 illustrates what happens next. Line 93 represents end node 73. End node 73 forwards a network packet 98 to second level hub 61. Second level hub 61 is represented by a line 91. Second level hub 61 forwards network packet 98 to root hub 60. Root hub 60 is represented by a line 90. Root hub 60 will forward network packet 98 to second level hub 62 and second level hub 63. Also the end node on the network which is the destination for network packet 98 will receive network packet 98. In FIG. 6, the end node which is addressed by the network packet is represented by line 94 and the second level hub to which the destination hub is addressed is represented by line 92.

After second level hub 61 has completed forwarding the message to root hub 60, second level hub will send an acknowledge 96 to end node 75. End node 75 is represented by a line 95. Second level hub 61 will also send a two-tone high level request sequence 97, as described above, to root hub 60 indicating another high level priority network packet will follow. End node 75 will send a network packet 99 to second level hub 61. Second level hub 61 forwards network packet 99 to root hub 60. Root hub 60 will forward network packet 99 to second level hub 62 and second level hub 63.

Also the end node on the network which is the destination for network packet 99 will receive network packet 99. The end node which is addressed by the network packet is represented by line 94 and the second level hub to which the destination hub is addressed is represented by line 92.

Figure 7:
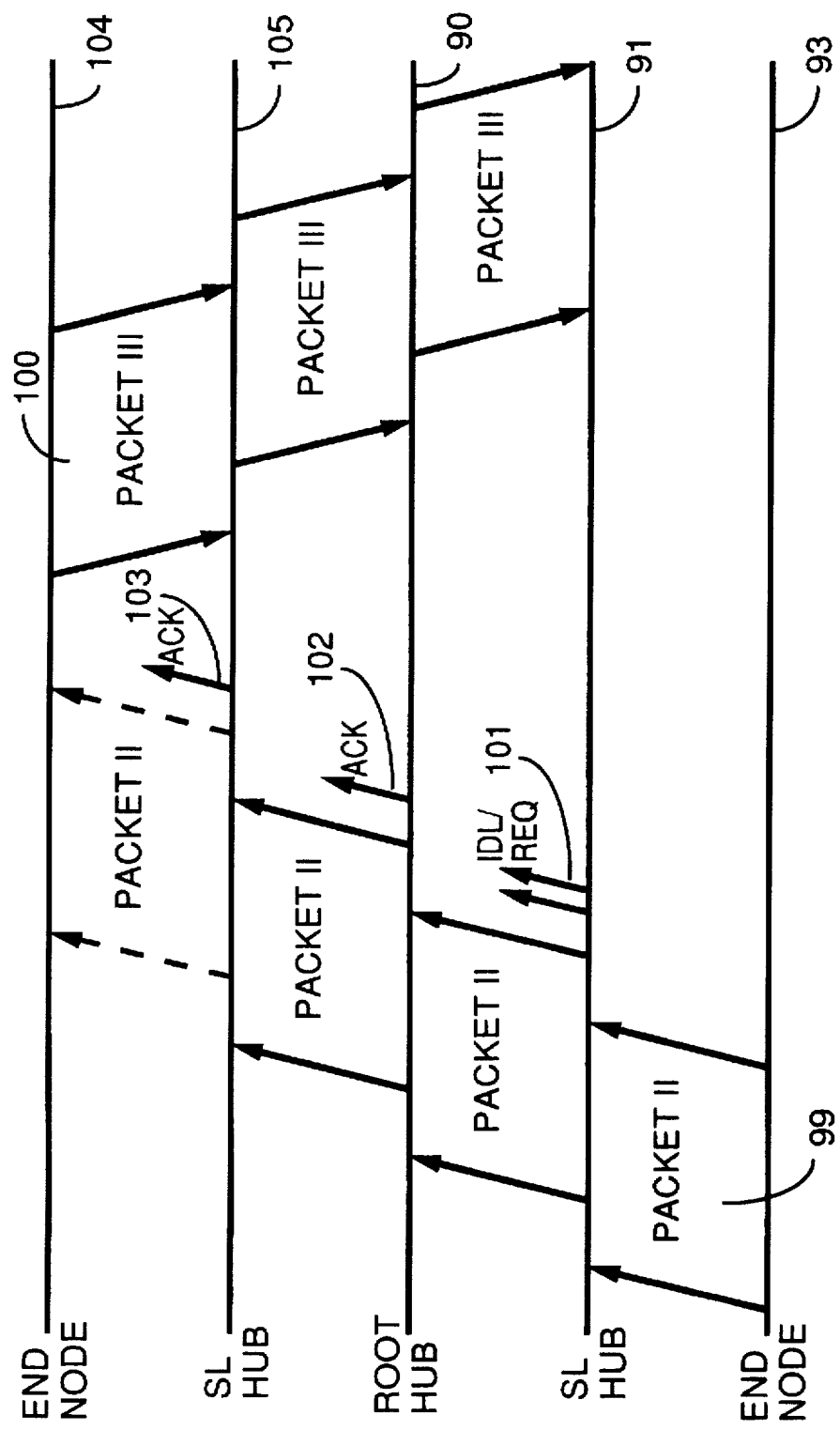
FIG. 7 further illustrates the operation of a protocol for the network configuration shown in FIG. 5 in accordance with a preferred embodiment of the present invention.

As illustrated by FIG. 7, after second level hub 61 forwards network packet 99 to root hub 60, second level hub 61 will forward a two-tone idle sequence 101, indicating that second level hub 61 has finished the sweep of all its end nodes which had a high priority network packet to send. Provided none of end nodes 73, 74 or 75 have newly requested to send a high priority network packet, two-tone idle sequence 101 will consist of an Idle followed by a ReqN. This indicates to root hub 60 that second level hub 61 has no more high priority network packets to send, but has normal priority network packets to send. If before or during the sending of network packet 99, one of end nodes 73, 74 or 75 newly requests to send a high priority network packet, two-tone idle sequence 101 will consist of an Idle followed by a ReqH.

Upon receiving two-tone idle sequence 101, root hub 60 will send an acknowledge signal 102 to second level hub 62. In FIG. 7, second level hub 62 is represented by a line 105. Second level hub 62 will send an acknowledge 103 to end node 77. End node 77 is represented by a line 104. End node 77 will then send its high priority network packet 100 to second level hub 62. Second level hub 62 forwards network packet 100 to root hub 60. Root hub 60 will forward network packet 100 to second level hub 61 and second level hub 63. Also the end node on the network which is the destination for network packet 100 will receive network packet 100.

After all high priority network packets have been sent, the normal priority network packets will be serviced. In the example, root hub 60 will first grant an acknowledge to end node 72. After end node 72 has sent its normal priority network packet, end node 72 will send an idle signal to root hub 60. Root hub 60 will then send an acknowledge to second level hub 61. Second level hub 61 will then send an acknowledge to end node 74. After end node 74 has sent its normal priority network packet, end node 74 will send an idle signal to second level hub 61. Second level hub 61 will send a two-tone idle sequence signal to root hub 60. Provided none of end node 73, 74 or 75 newly request to send a normal priority network packet, the two-tone idle sequence will consist of an Idle followed by an Idle. This indicates to root hub 60 that second level hub 61 has no more packets to send. If before, during or immediately after the time end node 74 is sending the normal priority network packets, one of end nodes 73 or 74 newly requests to send a normal priority network packet, the two-tone idle sequence will consist of an Idle followed by a ReqN. After root hub 60 receives the two-tone idle sequence from second level hub 61, root hub 60 will then send an acknowledge to second level hub 62.

If in middle of a second level hub serving normal priority network packets, root hub 62 becomes aware of an end node sending high priority request (ReqH) or of a second level hub sending a high priority request (which would have originated from one of the end nodes of the second level hub), root hub 60 needs to ensure that the high priority request is serviced quickly. It does this by sending a burst of Preempt during the request window of the inter packet gap to the second level hub. This is different than the silence root hub 60 normally sends to an acknowledged second level hub during the interpacket gap. In the preferred embodiment, the "Preempt" signal is used, in an alternate embodiment, the "Idle" signal may be used instead of the "Preempt" signal.

The burst of Preempt forces the second level hub to send control back to the root hub after the current packet has been sent.

Figure 8:
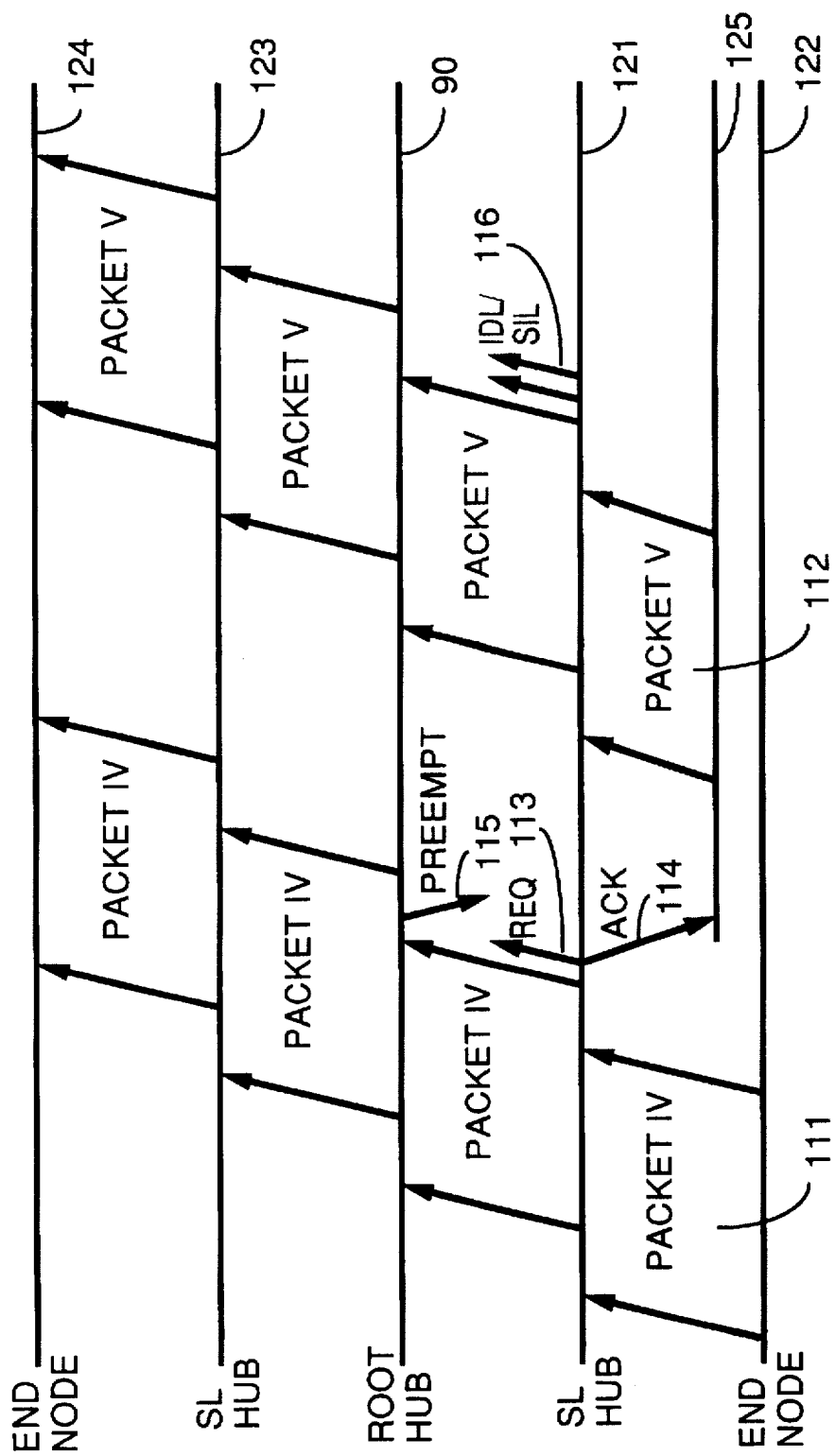
FIG. 8 additionally illustrates the operation of a protocol for the network configuration shown in FIG. 5 in accordance with a preferred embodiment of the present invention.

For example, FIG. 8 illustrates this. In the example discussed above, once second level hub 63, represented by a line 121, is acknowledged for normal priority network packets, second level hub 63 acknowledges end node 78. End node 78 forwards a normal priority network packet 111 to second level hub 63. Second level hub 63 forwards network packet 111 to root hub 60. Root hub 60 is represented by line 90. Root hub 60 will forward network packet 111 to second level hub 61 and second level hub 62. Also the end node on the network which is the destination for network packet 111 will receive network packet 111. In FIG. 6, the end node which is addressed by the network packet is represented by line 124 and the second level hub to which the destination hub is addressed is represented by line 123.

After second level hub 63 has completed forwarding network packet 111 to root hub 60, second level hub 63 will send an acknowledge 114 to end node 79. End node 79 is represented by a line 125. Second level hub 63 will also send a normal level request 113 to root hub 60 indicating another normal level priority network packet will follow. If root hub 60 is aware of an end node which desires to send a high priority network packet, root hub 60 will send a burst preempt signal 115 to second level hub 63 at the completion of receipt of network packet 111.

Because end node 79 has already been acknowledged, end node 79 will send a network packet 112 to second level hub 63. Second level hub 63 forwards network packet 112 to root hub 60. Root hub 60 will forward network packet 112 to second level hub 61 and second level hub 62. Also the end node on the network which is the destination for network packet 112 will receive network packet 112. The end node which is addressed by the network packet is represented by line 124 and the second level hub to which the destination hub is addressed is represented by line 123.

After second level hub 63 has forwarded network packet 112 to root hub 60, second level hub 63 sends a two-tone idle sequence 116 to root hub 60. Even though second level hub 63 has not serviced the normal priority network packet from end node 80, second level hub 63 gives two-tone idle sequence 116 to root hub 60 in response to preempt 115, sent in the previous inter packet gap. Receipt of two-tone idle sequence 116 allows root hub 60 to give an acknowledge for the high priority network packet.

Two-tone idle sequence 116 will consist of an Idle followed by the return signal (silence). This indicates to root hub 60 that the sweep of normal priority network packets by second level hub 61 was interrupted before it was completed. Therefore, when all pending high priority network packets have been attended to, root hub 60 will acknowledge second level hub 61 allowing second level hub 61 to complete the sweep of normal priority network packets. If none of the end nodes 78, 79 and 80 had normal packets to send, then two-tone idle sequence 116 would have consisted of an Idle followed by another Idle.

FIGS. 9 through 12 illustrate error handling in the cascaded network. Specifically, FIGS. 9 through 12 illustrate what happens when a hub sends a grant to a particular port to send a network packet and no network packet is received by the hub over the port.

Figure 9:
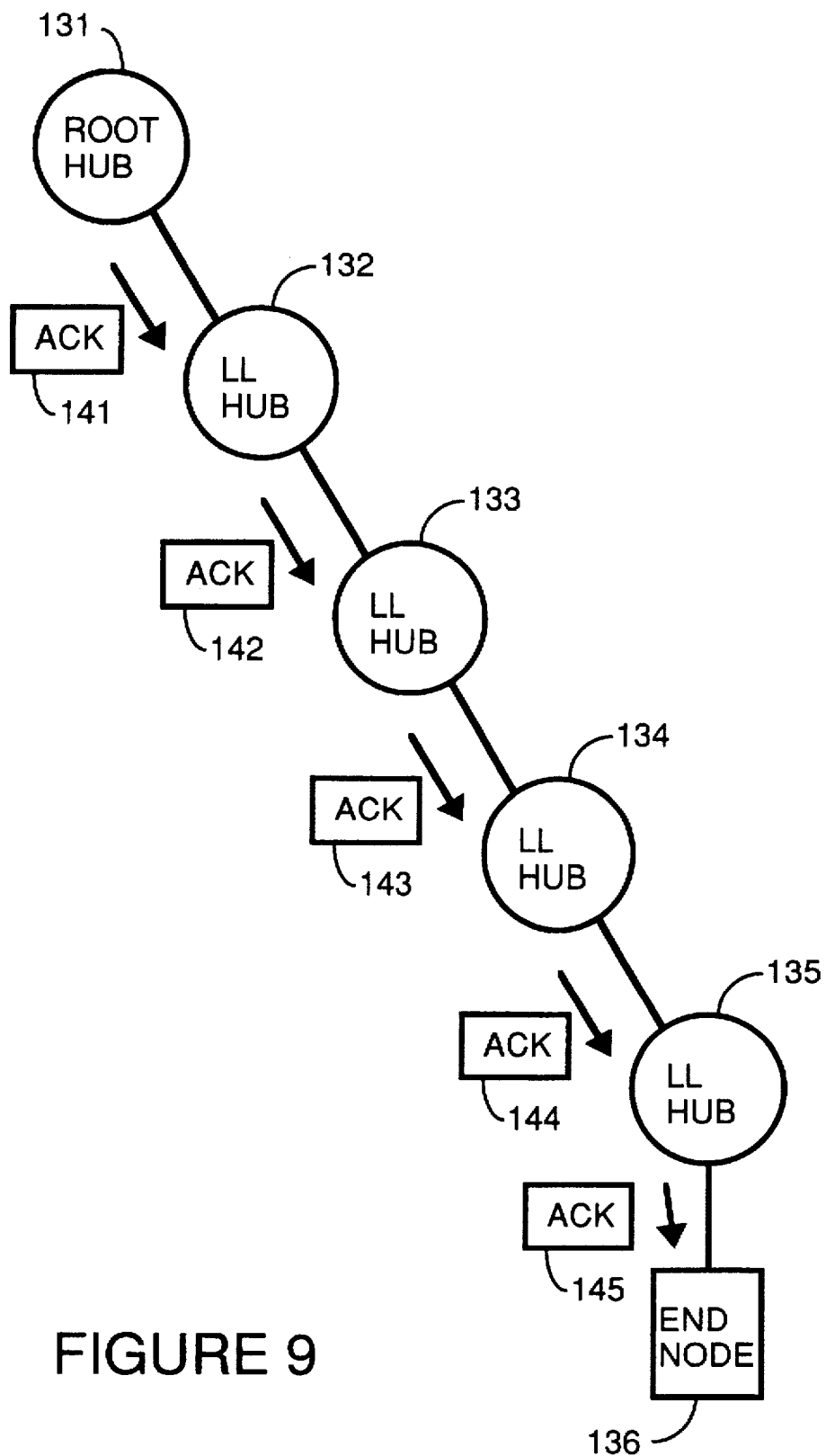
FIG. 9 shows an acknowledge propagated down a network of cascaded hubs in a network, in accordance with a preferred embodiment of the present invention.

For example, FIG. 9 shows a portion of a network of cascaded hubs in which an end node 136 has requested to send a network packet, as discussed above. The network packet may be high priority network packet or a normal priority network packet. A root hub 131 sends an acknowledge (grant) 141 to a lower level hub 132. In turn, low level hub 132 sends an acknowledge 142 to a lower level hub 133. In turn, low level hub 133 sends an acknowledge 143 to a lower level hub 134. Low level hub 134 sends an acknowledge 144 to a lower level hub 135. Low level hub 135 sends an acknowledge 145 to end node 136.

Figure 10:
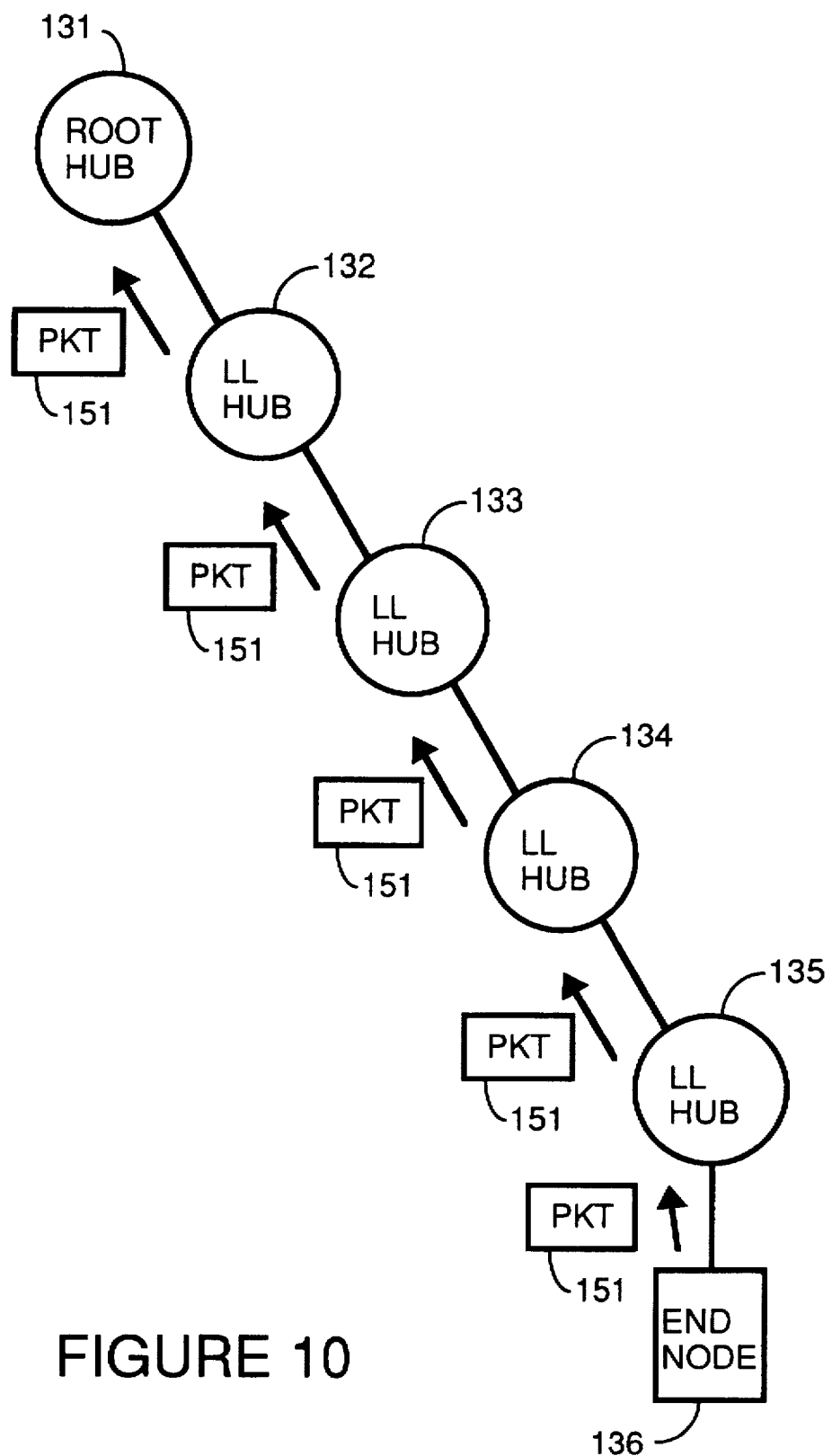
FIG. 10 shows a network packet propagated up the network of cascaded hubs shown in FIG. 9, in accordance with a preferred embodiment of the present invention.

As described above, in normal operation, once end node 135 receives acknowledge (grant) 144, end node 136 will begin sending the acknowledged network packet. This is illustrated by FIG. 10. As shown in FIG. 10, end node 136 sends a network packet 151 to lower level hub 135. Lower level hub 135 forwards network packet 151 to lower level hub 134. Lower level hub 134 forwards network packet 151 to lower level hub 133. Lower level hub 133 forwards network packet 151 to lower level hub 132. Lower level hub 132 forwards network packet 151 to root hub 131. As will be understood, from prior discussion, the network packet will also be forwarded to various other destinations.

In order to take into account the possibility of a fault, each hub, after it sends an acknowledge (grant), starts an error timer. In the preferred embodiment, the timer is 450 microseconds. If the hub does not receive the network packet before the expiration of the timer, the hub will generate start to deliver a void network packet, also referred to herein as an error packet. The error packet is a substitute for the network packet which did not arrive in response to the acknowledge. The reason an error packet is sent is because the network expects a network packet, and therefore, a packet is sent, even though the packet did not originate at the end node which received the grant.

Figure 11:
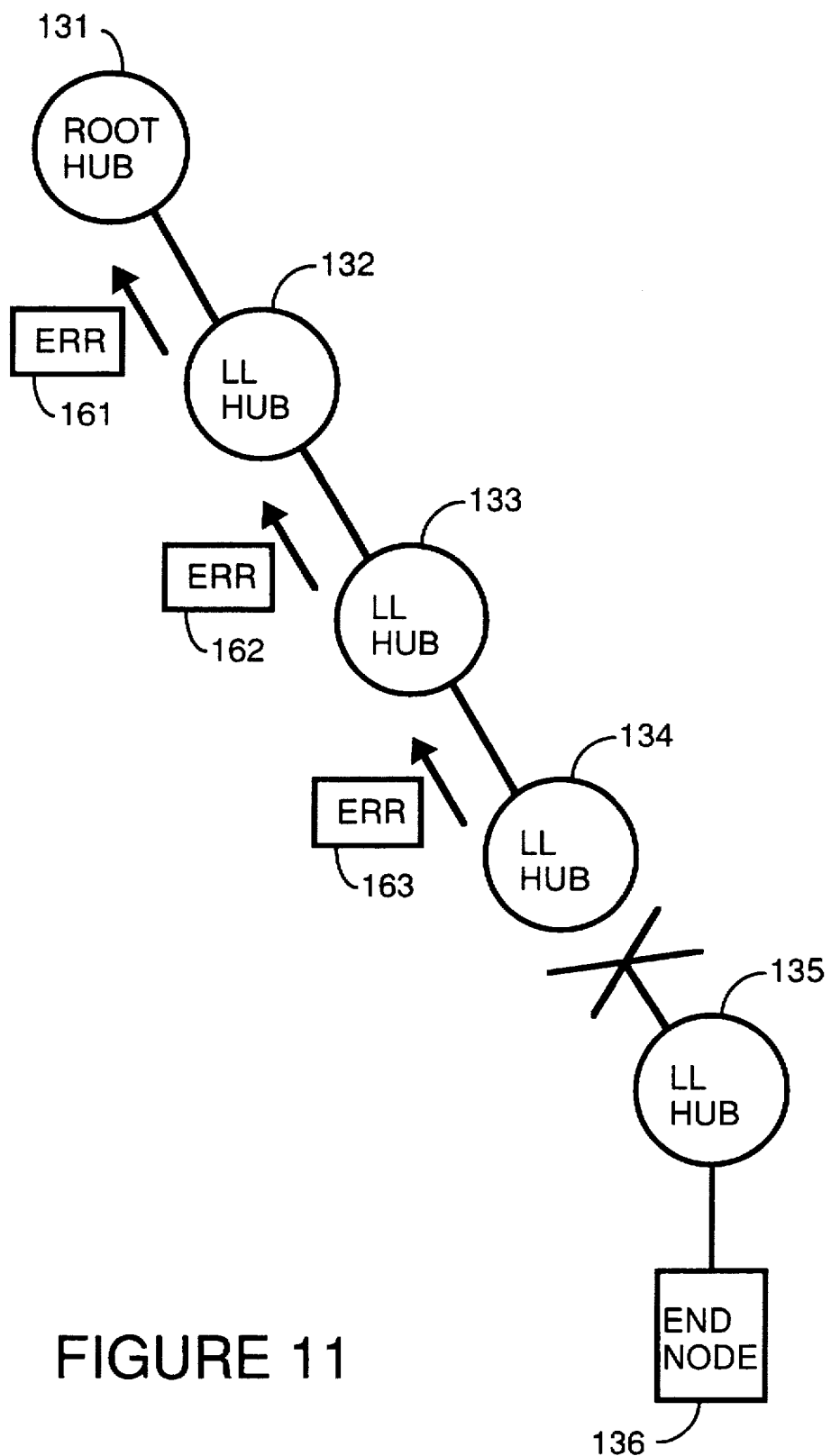
FIG. 11 shows an error packet propagated up the network of cascaded hubs shown in FIG. 9, in accordance with a preferred embodiment of the present invention.

This is illustrated by FIG. 11. In FIG. 11, after end node 136 has been acknowledged, a network catastrophe occurs resulting in the link between lower level hub 134 and lower level hub 135 being disconnected. Therefore, even if lower level hub 135 receives a network packet from end node 136, lower level hub 135 is unable to forward the network packet to lower level hub 134.

Because lower level hub 132, does not begin to receive a network packet from lower level hub 133 before the expiration of its timer, lower level hub 132 will forward to root hub 131 an error packet 161. Likewise, when lower level hub 133, does not begin to receive a network packet from lower level hub 134 before the expiration of its timer, lower level hub 133 will forward to lower level hub 132 an error packet 162. When lower level hub 134, does not begin to receive a network packet from lower level hub 135 before the expiration of its timer, lower level hub 134 will forward to lower level hub 133 an error packet 163.

As can be seen from the above discussion, each hub sends an acknowledge to a lower level hub and then starts its timer. Thus, timers for hubs towards the top of a stack of hubs expire sooner than hubs at the bottom of the stack. If, as illustrated by FIG. 11, the error occurs down low in a stack of hubs, several timers expire. For this reason, if the mere expiration of a timer resulted in a hub marking a link to the affected port as being down, this could adversely affect performance of the network. For example, as shown in FIG. 11, the link between lower level hub 134 and lower level hub 135 was broken. Yet the timer for lower level hub 132 and the timer for lower level hub 133 would both expire before lower level hub 134 had an opportunity to generate and forward an error message to lower level hub 133.

It is possible that the length of each timer could be varied based on closeness to the root hub. However, in the preferred embodiment of the present invention, only the root hub knows its position in the cascaded network. In such a system, varying the length of the timer is generally unworkable.

In the preferred embodiment of the present invention, the issue is handled as follows. Upon a timer expiring for an acknowledged port, a hub creates and begins to forward a 600 byte error packet. If the hub completely sends the 600 byte error packet before beginning to receive any network packet on the acknowledged (and now timed out port) the port is marked as failed and is not granted further messages until it has been reinitialized. Connected to a port marked as failed may be an end node or a whole subsection of the cascaded network.

When a first hub begins to send a 600 byte error packet and before completion of sending the 600 byte error packet, the first hub detects activity on the acknowledged (and timed out) port, the port is considered still working. The activity is a new error packet set from a lower level hub on the port. The first hub immediately appends the new error packet onto the error packet being sent to the hub above. In the preferred embodiment, the 600 byte error packet contains void data. For example, the data within the 600 byte error packet may be all zeros. When the first hub appends the new error packet to the 600 byte error packet, this may be done, for example, by adding the actual content of the new error packet to the error packet, or merely by elongating the 600 byte error packet (for example by adding void data) an amount equal to the length of the new error packet.

Figure 12:
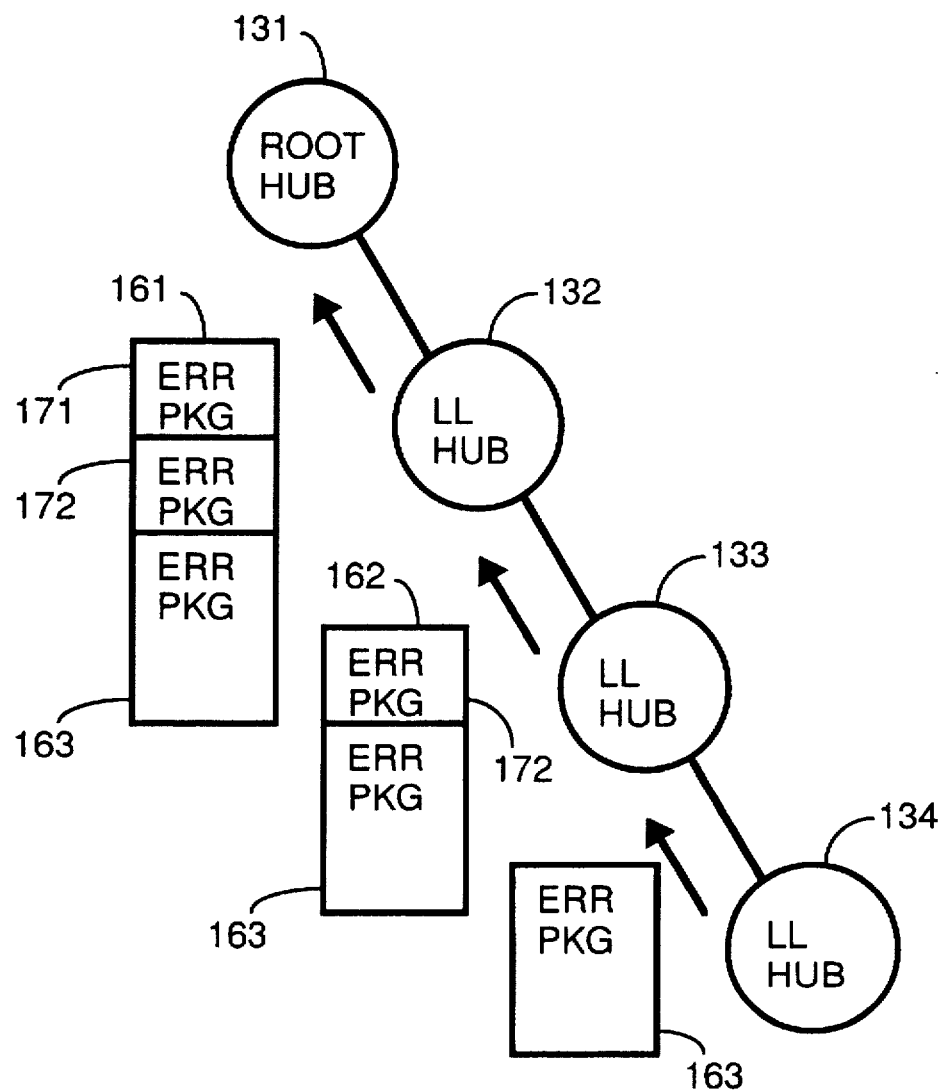
FIG. 12 shows more detail of the error message propagated up the network of cascaded hubs as shown in FIG. 11, in accordance with a preferred embodiment of the present invention.

Appending of an error packet is illustrated by FIG. 12. As discussed above, when lower level hub 132 does not begin to receive a network packet from lower level hub 133 before the expiration of its timer, lower level hub 132 will forward to root hub 131 error packet 161. A first part of error packet 161 is a partial error packet 171. Likewise, when lower level hub 133, does not begin to receive a network packet from lower level hub 134 before the expiration of its timer, lower level hub 133 will forward to lower level hub 132 error packet 162. A first part of error packet 162 is a partial error packet 172. When lower level hub 132 begins to receive error packet 162, lower level hub 132 appends error packet 162 to partial error packet 171. For example, if lower level hub 132 has sent only 100bytes to root hub 131 when lower level hub 132 begins to receive error packet 162, lower level hub 132 will begin forwarding error packet 162 on without sending any more bytes of partial error packet 171.

When lower level hub 134, does not begin to receive a network packet from lower level hub 135 before the expiration of its timer, lower level hub 134 will forward to lower level hub 133 an error packet 163. When lower level hub 133 begins to receive error packet 163, lower level hub 133 appends error packet 163 to partial error packet 172. For example, if lower level hub 133 has sent only 100bytes to lower level hub 132 when lower level hub 133 begins to receive error packet 163, lower level hub 133 will begin forwarding error packet 162 on without sending any more bytes of partial error packet 172.

Thus in the example shown in FIG. 12, error packet 163 includes 600 bytes. Error packet 162 includes 700 bytes: 100bytes of partial error packet 172 and all of error packet 163. Error packet 161 includes 800 bytes: 100bytes of partial error packet 171, 100bytes of partial error packet 172 and all of error packet 163.

While the basic error packet size of 600 bytes may be freely varied, it is important that the error packet size be sufficiently large so that when there are timeouts for a number of stacked hubs, a hub will not finish sending an error packet before beginning to receive a new error packet from a lower, still active hub.

Also, in the above illustration, error packets are shown propagating from lower level hubs to higher level hubs. As will be understood by persons of ordinary skill in the art, the error packets are distributed over the network to all the hubs and end nodes which would have received the network packet which is not sent. Thus the error packet is distributed over the network as if it was the network packet.

In addition, in a preferred embodiment of the present invention, lower level hubs expecting a network packet from a higher level hub also set timers and, upon expiration of the timer, begin sending an error packet on ports connected to devices also expecting the network packet. If, after beginning to send an error packet to a lower level port, activity is detected from the higher level hub, the new error packet from the higher level hub is appended to the error packet being sent out the ports of the lower level hub. As discussed above, the new error packet is appended by forwarding the contents of the new error packet as part of the original error packet, or by elongating the original error packet (for example, by adding zeros) an amount equal to the length of the new error packet.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I Claim:

1. In a network system in which end nodes are connected to a plurality of cascaded hubs, a method comprising the steps of:
   (a) starting a first timer upon a first hub acknowledging, to a second hub, a grant to send a first network packet, the second hub being connected to a first port of the first hub;
   (b) starting a second timer upon the second hub acknowledging, to a first device connected to a first port of the second hub, the grant to send the first network packet;
   (c) upon expiration of the first timer without the first hub beginning to receive the first network packet, beginning to send, by the first hub, a first error packet to a second device connected to the first hub;
   (d) upon expiration of the second timer without the second hub beginning to receive the first network packet, beginning to send, by the second hub to the first hub, a second error packet; and,
   (e) when the second hub does not begin to receive any error packet from the first device before completely sending the second error packet, marking, by the second hub, the first port of the second hub as failed, the first port of the second hub not being marked as failed when the second hub does begin to receive an error packet from the first device before completely sending the second error packet.

2. A method as in claim 1 wherein in step (b) the first device is an end node.

3. A method as in claim 1 wherein in step (b) the first device is a third hub.

4. In a network system in which end nodes are connected to a plurality of cascaded hubs, a method comprising the steps of:

(a) starting a first timer upon a first hub acknowledging, to a first device being connected to a first port of the first hub, a grant to send a first network packet;

(b) upon expiration of the first timer without the first hub beginning to receive the first network packet, beginning to send, by the first hub, a first error packet to a second device connected to the first hub; and, (c) when the first hub does not begin to receive a second error packet from the first device before completely sending the first error packet, marking, by the first hub, the first port of the first hub as failed, the first port of the first hub not being marked as failed when the first hub does begin to receive the second error packet from the first device before completely sending the first error packet.

5. A method as in claim 4 wherein in step (a) the first device is a second hub and wherein the method includes the following steps:

(d) starting a second timer upon the second hub acknowledging, to a third device connected to a first port of the second hub, the grant to send the first network packet; and, (e) upon expiration of the second timer without the second hub beginning to receive the first network packet, beginning to send, by the second hub to the first hub, the second error packet.

6. A method as in claim 5 additionally comprising the step of:

(f) upon the second hub beginning to receive a third error packet from the third device before completely sending the second error packet, appending the third error packet to the second error packet.

7. A method as in claim 6 additionally comprising the step of:

(g) when the second hub does not begin to receive any error packet from the third device before completely sending the second error packet, marking, by the second hub, the first port of the second hub as failed.

8. A method as in claim 6 wherein in step (f), the third error packet is appended to the second error packet so that the second error packet includes a portion of the second error packet sent by the second hub before the second hub began to receive the third error packet and includes the third error packet.

9. A method as in claim 5 wherein in step (d) the third device is an end node.

10. A method as in claim 5 wherein in step (d) the third device is a third hub.

* * * * *